United States Patent [19]

Whitehouse

[11] 3,873,958

[45] Mar. 25, 1975

[54] ACOUSTIC BEAM FORMER

[75] Inventor: Harper John Whitehouse, San Diego, Calif.

[73] Assignee: The United States of America as represented by the Secretary of the Navy, Washington, D.C.

[22] Filed: Dec. 26, 1973

[21] Appl. No.: 428,461

[52] U.S. Cl. .............................................. 340/6 R
[51] Int. Cl. ............................................. G01s 3/80
[58] Field of Search ......................... 340/6 R, 16 R

[56] References Cited
UNITED STATES PATENTS

| | | | |
|---|---|---|---|
| 3,307,190 | 2/1967 | Clay, Jr. et al. | 340/6 R X |
| 3,346,862 | 10/1967 | Raudsep | 340/6 R X |
| 3,670,335 | 6/1972 | Hirsch | 340/6 R X |

*Primary Examiner*—Richard A. Farley
*Attorney, Agent, or Firm*—Richard S. Sciascia; Ervin F. Johnston; John Stan

[57] ABSTRACT

A beam former, including a receiving array which receives a sonar signal, which may be passive, and a receiver which processes the received signal. The receiving array includes a flat plate of material, capable of receiving reflected acoustic signals across its broad face, and an array of receiving elements, for example transducing elements disposed parallel to each other on the surface of the plate, the distance d between two adjacent elements being less than the velocity of propagation C of waves in the flat plate divided by the bandwidth B determed by the highest operating frequency of the array. Each element has a predetermined weight and polarity for its position in the array. A signal summer has as its inputs the outputs of each of the elements of the array. A cable is connected to the output of the signal summer.

The beam former further comprises the receiver of the beam former, whose input is connected to the cable, comprising a plurality of transversal filters, each of whose inputs are connected to the cable, each filter having as may taps as there are elements in teh array, the taps having the same weights and polarities, in the same order order or in reversed order, as the elements of the array, corresponding taps in the various transversal filters having different time delays with respect to adjacent taps in the same filter. The outputs of the filters thereby provide various compressions or expansions of the element weights, it thereby being possible to determine the direction of the incident signal by observing which filter has the largest output.

4 Claims, 4 Drawing Figures

GENERALIZED CONCEPT OF BEAM FORMER.

GENERALIZED CONCEPT OF BEAM FORMER.

RESPONSE OF ARRAY AS A FUNCTION OF THE ANGLE OF THE INCOMING SIGNAL.

BEAMFORMER FOR CARDIOID RESPONSE

CARDIOID ENVELOPE OF BEAM FORMER RESPONSE.

3,873,958

ACOUSTIC BEAM FORMER

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention relates to an ambiguity function beam former which permits the processing of multiple simultaneous beams from an array of elements without having to bring back a lead from each element. The simplest embodiment of the concept involves a line array of elements, each element being assumed to have a weight which is complex, that is, has a magnitude and a sign associated with it, so that there are weights from $W_1$ to $W_N$. The weights, which could represent the sensitivities of the hydrophone elements which are the elements of the array, are connected together by a summer, for example by having all the elements connected in parallel. A cable comprising a single lead with its ground return comes out of the summer, and is fed into a receiver.

This signal from the cable is fed into one of the filters which comprise the receiver and when one of the filters has very closely the same weights and the same phases as the signal coming in, it will produce an output, due to the autocorrelation which takes place, that is, the signal is matched to a filter and the weights chosen to give a delta function output, there will be one and only one time at which a pulse will come out. This will be when a signal will have come into the array, generated a voltage in the array, and that voltage is detected in the receiver. If, however, instead of a single signal pulse, there is a train of voltages, caused by the acoustic waves incident upon the array, each of them in turn will generate a delta function at the output of the receiver, and the train of voltages will be reproduced at the output.

By the sampling theorem, since any signal may be represented by a train of voltages, the representation of the samples at the same rate, it can be seen that the output of the receiver is a continuous function corresponding to the continuous input to the array.

DESCRIPTION OF THE PRIOR ART

In the prior art methods a multiplexer, frequency or time division, is required whenever the number of array elements is greater than the number of available leads. This greatly increases the cost and complexity of the arrays and limits their use in expandable applications.

SUMMARY OF THE INVENTION

This invention relates to a beam former which is able to provide beam forming capability to arrays which have more array elements than leads.

In this invention an array composed of discrete on continuous elements is visualized as being divided into N elements. These may be either real elements, groups of elements, or imaginary elements of a continuous array such that the distance between centers, $d$, is less than the velocity of propagation of waves in the medium surrounding the array, C, divided by the bandwidth, B, determined by the highest operating frequency of the array, i.e., $d < C/B$. Each element is assigned a sensitivity, or weight, and a polarity, or sign according to its position in the array, which constitutes a weight vector, $w$, which in the limit as $N \to \infty$ for continuous arrays becomes continuous.

The weighted and signed outputs from the N elements are combined in a summer to a single signal, which may be transmitted over a pair of wires or a coaxial cable. This signal then enters a transversal filter at the receiver, which may be at the operating frequency of the array or at some intermediate frequency if the receiver contains frequency or time-duration changing elements. Optional signal may have been added if necessary at the array, along the cable, or at the input of the receiver or at all of these places, if desired. The N output taps of the transversal filter are chosen to be the same as the weights of the array and may be in either increasing or decreasing order or both. In particular, many filters may be connected to the array with different delays, $\tau_j$, between adjacent taps. It will be recognized by those skilled in the art that the transversal filters are filters matched to various compressions or expansions of the array weight vector, and thus the output of any transversal filter is the cross-correlation of the array weight vector with a time modified weight vector, and the totality of such outputs corresponds with suitable normalization to the wideband ambiguity function of the weight vector, where the particular receiver filter corresponds to a wideband doppler modification of the weight vector. Since the output of such a linear system is the convolution of the input signal, i.e., the signal incident on the array, with the ambiguity function represented by the receiver's reponse to an impulse at the array, the direction if the incident signal can be determined by observing which filter has the largest output.

The advantage of the beam former of this invention is that a direct relation exists between the direction of incidence of a signal on the array and the filter which has the largest output. This relationship may be enhanced just as a conventional beam former may be enhanced by judiciously choosing the weights to achieve minimum side lobes for a given signal bandwidth. For this beam former the auto-correlation function of the weight sequence gives the bandwidth of the array and the direction sidelobes are given by the wideband doppler behavior of the weight sequence. An example of a weight sequence with good auto-correlation properties is:

−0.57, +0.27, −0.56, +0.55, −0.14, −0.28, −0.31, −1.00, −0.43,

+0.50, +0.037, −0.34, +0.22, +0.43 The above sequence is a Huffman sequence of length 14, having only real coefficients.

It should be noted that the material direction for a beam in this beam former is end fire, which end depends on whether the filter weights are in the same order or opposite order to the weights on the array. Also beams will be formed for other angles off of end fire but their sensitivity will decrease toward broadside, thus giving a beam envelope like a FIG. 8 (see FIG. 2).

OBJECTS OF THE INVENTION

An object of the invention is to provide a beam former which permits the processing of mulitiple simultaneous beams from an array of elements without the necessity of providing a lead for each element.

Another object of the invention is the provision of a beam former wherein the array may be a planar array in some embodiments and a linear array in others.

Other objects, advantages and novel features of the invention will become apparent from the following detailed description of the invention, when considered in conjunction with the accompanying drawings.

DESCRIPTION OF THE PREFERRED EMBODIMENTS

Figure 1:
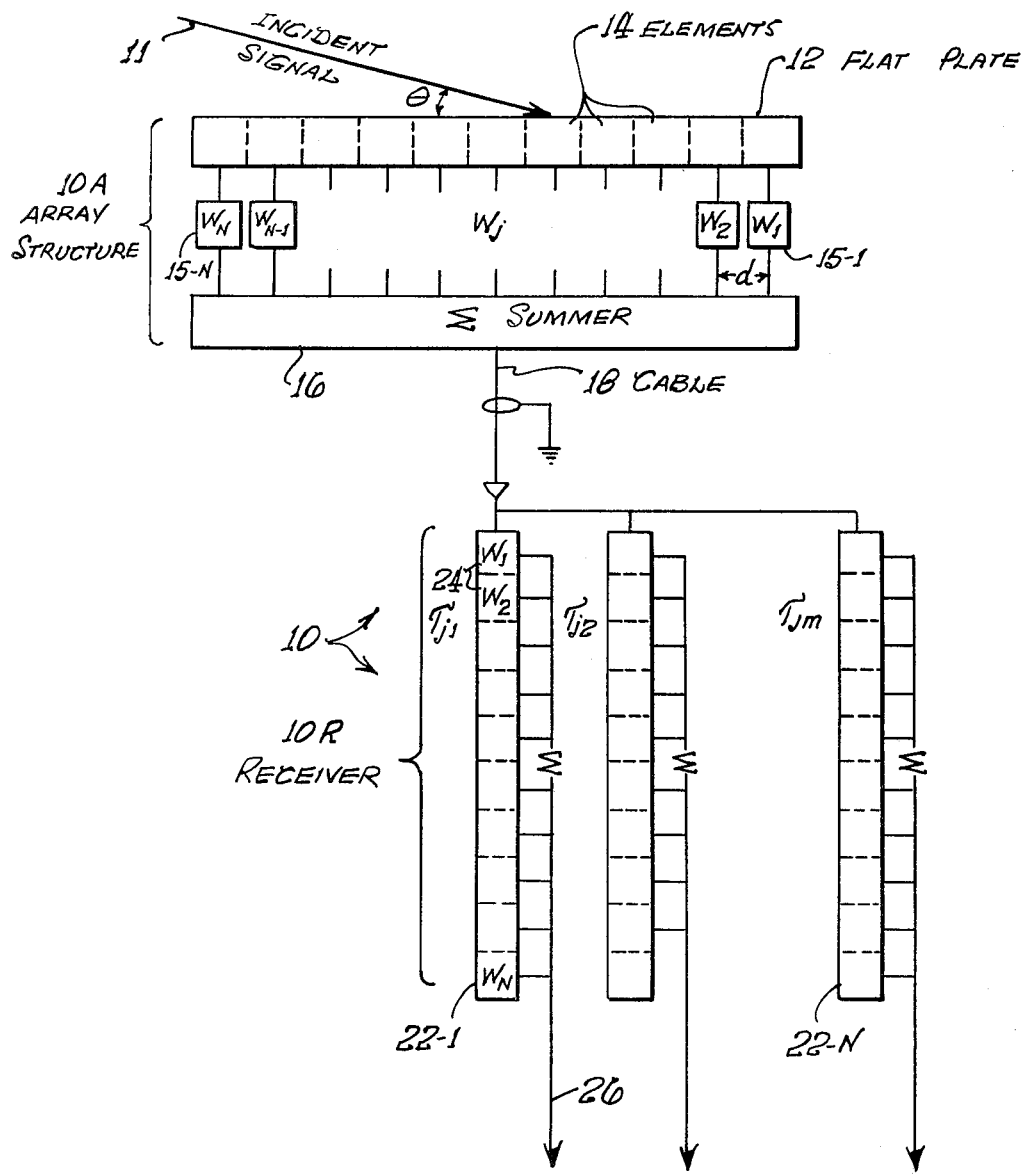
FIG. 1 is a diagrammatic view of a generalized embodiment of the beam former of this invention.
Figure 2:
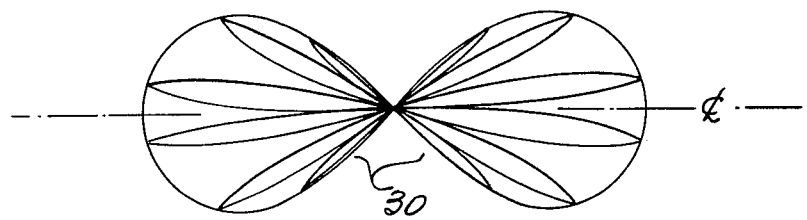
FIG. 2 is a plot of the response of an array of elements as a function of the angle of the incoming signal with respect to the plane of the array.

Referring now to the figures, and beginning with FIG. 1, this figure shows a beam former 10, including a receiving array 10 A, which receives a signal 11 which may be passive, and a receiver 10 R which processes the received signal. The receiving array 10 A includes a flat plate of material 12, capable of receiving reflected acoustic signals, traversing a medium with velocity C, across its broad face. An array of elements 14, for example, transducing metallic elements, are disposed parallel to each other on the surface of the plate 12, the distance d between two adjacent elements being less than the velocity of propagation C of waves in the flat plate divided by the bandwidth B determined by the highest operating frequency of the array 10 A. Each element 14 has a predetermined weight and polarity for its position in the array 10A.

A signal summer 16 has as its inputs the outputs of each of the elements 14 of the array 10 A. A cable 18 is connected to the output of the signal summer 16.

The beam former 10 further comprises a receiver 10 R, whose input is connected to the cable 18. The receiver 10 R comprises at least one transversal filter, labeled 22-1 through 22 N, each of whose inputs are connected to the cable 18, each filter having as many taps 24 as there are elements 14 in the array 10 A, the taps having the same weights and polarities, in the same order or in reversed order, as the elements of the array, corresponding taps in the various transversal filters having different time delays $\tau_{jn}$ with respect to adjacent taps in the same filter. The outputs 26 of the filters, 22-1 through 22-N, thereby provide various compressions or expansions of the array element weights, it thereby being possible to determine the direction of the incident signal 11 by observing which filter has the largest output.

In the beam former 10 shown in FIG. 1, the array 10 A of receiving elements 14 may comprise a linear array, as shown. If FIG. 1 be considered a cross-sectional view, the beam former 10 may be considered to comprise a planar array, with a plurality of columns of elements 14 and a plurality of columns of filters, 22-1 through 22-N. A planar array would consist of a number of line arrays, each with an ambiguity beam former, with the outputs from each time-compression filter beam formed in the orthogonal direction by a conventional beam former. Similarly, a cylindrical, surface or volume array could have each linear array ambiguity beam formed and then the outputs beam formed conventionally.

Alternatively, if it is desired to have a beam envelope which is approximately cardioid, a delay equal to $d/C$ can be introduced between each element 14 of the array 10A before summation. See FIG. 3 and FIG. 4.

In the beam former 10, shown in FIG. 1, the receiving elements 14 may be transducing elements, whereupon the beam former 10 may be adapted for receiving a sonar signal.

Used for different purpose, the elements 14 may be small receiving antennas.

Discussing now the theory behind the invention, the direction of the incident acoustic signal 11 may be determined by means of this invention. The incoming signal is received by an array of elements 14 on the material 12. If it is to be assumed that the array of elements 14 is a linear array composed of a series of hydrophone elements connected contiguously together, as indicated by the dotted lines in FIG. 1, then, there may be incident upon this array a sound field, and this field will cause each hydrophone element to generate a voltage in response to the sound field. These elements 14 are weighted as indicated by the symbol $W_N$ could be accomplished by using resistors of appropriate values, they could be the remanent polarization in a ceramic, or any other means of using weighted components.

The direction of the signal source 11 in a line array is the direction of the sound to the axis defined by the line, from which it may be seen that the sound at this angle $\theta$ to the array is the same all around the array, that is, is cone shaped. This angle varies with the specific location of the signal source. Therefore, the beams being formed by a line array may be considered to be a set of cones, the apexes of the cones being centered on the line array, the cone angles being determined by the resolution that the array has in angle, and, therefore, the direction of the sound source can then be determined from which cone the signal arrival is on.

With a plane array of elements 14 instead of a line array, two sets of angles could be determined, and therefore a unique angle in space, determined by the intersection of two sets of cones.

Discussing now in more detail weighting $w_N$, beginning with a line array, the weighting is determined by the desired ambiguity function that it is desired that the output have. An example is provided hereinbelow of a weighting $w_N$ involving a Huffman code. This results in an autocorrelation function, which results in a delta function output, with very small residual side-bands.

The input signals 11 may be assumed to be vectors, since they have a magnitude and a phase angle. Ordinarily, when vectors are added together, a single resultant vector is obtained having an amplitude and a phase angle. However, in this invention, all the vector signals do not enter the array 10 A simultaneously, there being a time delay between them, since the plane wave comprising the signal reaches first one element, $W_n$ as shown, then another element $W_{n-1}$ a little later, etc. Therefore, the summation is not an instantaneous summation, but rather a summation of signals 11 received by successive elements 14 with a time delay between successive received signals, in a manner similar to a received sonar signal.

If there were two received signals 11, each would generate a signal $W_1$ to $W_N$, the signal summer 16 would sum each of the two signals, they would be transmitted over the cable 18 and then to the assembly of filters, 22-1 through 22-N.

If there were N received signals, the intermediate steps would be as above, except that this time N signals would be transmitted through the cable 18 to the assembly of filters 21-1 through 22-N.

In summary, whatever the form of the input signal, that same input signal may be reconstructed in the output.

Since the array structure 10A is basically a passive array, it will operate successfully whether or not there is an active transmitter. However, if there is a transmitter, then the array structure 10 A will receive the transmitted signal. It reproduces the form of the transmitted signal in the receiver 10 R, and this signal in turn has to be passed into a conventional receiver of an echo ranging sonar.

The ordinary ambiguity in a sonar system refers to the ambiguity in range or doppler, and the term has the same connotation in this invention because the angle $\theta$ at which the sound is incident upon the array 10 A corresponds to doppler, or range rate, and time at which a pulse comes out, which is a function of the time at which a pulse came into the array, corresponds to range.

Discussing now the theory of the invention specifically with respect to its use with underwater signals, looking at some angle off of end fire, and generating in the water an impulse sound in the form of a plane wave whose normal makes the angle $\theta$ to the array 10 A, it can be determined what the impulse response $H(\theta)$ of the array is. It may be determined that $H(\theta)$ will correspond to a set of weights $w_N$ up to $w_1$ whose heights will be pulses corresponding to the impulses whose amplitudes and sign will be the weights of the array. And as the angle $\theta$ swings up to $\pi/2$ radians, the duration of the impulse response will decrease in a cosinusoidal manner, until at an angle $\theta$ of $\pi/2$ radians to the array the impulse response will have no duration at all, and all of the elements will be excited simultaneously, and there will be present an output which will be the sum of the weights from 1 to N. Then, as the angle $\theta$ increases to $\pi$ radians the impulse response will lengthen until at the time that the input signal 11 is coming from the opposite end of the array 10 A, the impulse response has the same duration as when $\theta$ was zero radians, however, this time the impulse response will the opposite order or sign. The sequences of the weights will be from the first weight $w_1$ up to the last weight, $W_N$.

Taking now the output from this array 10 A, and it might be considered, for the sake of a concrete example, to be a towed array behind a submarine, it may be put into a filter, for example into a linear filter. This linear filter will have an impulse response $H(t)$ to correspond to the impulse response of the array, which as $H(\theta)$. If there is a bank of filters, 22-1 through 22-N, so that there is a parameterization of the impulse responses for the filter, the totality of the outputs from all of these filters for the input at the given angle $\theta$ may be examined.

Let $H(t)$ from one particular filter be matched filter for the weight function of the array. It would then be weighted from $W_1$ up to $W_N$, its duration being equal to that of the array whose time function would be inverted. Then what comes out of that filter, which is now matched at some angle, is the autocorrelation function of the weight vectors. For an impulse into the array 10 A, an approximation to an impulse is obtained out of the filter. Examining the output from adjacent filters to see how much contamination there is, it will be found that the filters alongside have different duration of their impulse, they in turn being matched to the impulse response for a different input angle, and hence different duration. There is an output coming out, one from each filter, and if the totality of all of the outputs from each filter be taken and observed as a two-dimensional function, it would be determined that the two-dimentional representation would correspond to the wide-band ambiguity function for the weight distribution $w$.

Thus, each terminal of the bank of matched filters, 22-1 through 22-N, at the receiver 10 R corresponds to what may be termed a different "look direction" of the array 10 A. The fact that all of the outputs are available simultaneously means that the array has directivity in many directions simultaneously.

The bandwidth of the array is determined by the inherent bandwidth of the individual transducers 14 and the bandwidth of the weight distribution function $w$.

So that just as Barker codes and other codes may have central peaks and low sidelobes and narrow widths, one in turn could make the weights of the array random, so that one possible configuration is to have the weights all binary and to simply have random phase change. Now, the problem with this is that at broadside there is no output and that as the array swings over to the other side the weight vector changes its sign, that is, the order of the weights change.

Figure 3:
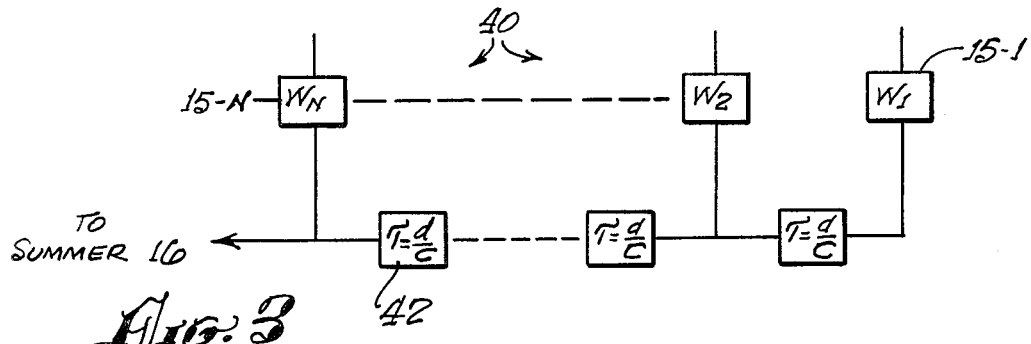
FIG. 3 is a diagrammatic view of a modified beam former with an improved cardioid response.
Figure 4:
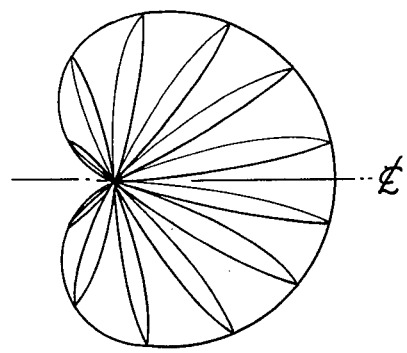
FIG. 4 is a plot of the cardiod response of the modified beam former shown in FIG. 3.

Referring now to FIG. 3, to solve this problem and still bring back a single lead from each element, a simple modification can be made, namely, a delay $d/C$ can be added from the output of each transducing element 14, such as a hydrophone, before the summation is made in summer 16. If this time delay is exactly equal to the time that it takes for the wave to travel along the array from one element to the next, then the entire pattern will be shifted, and it will be found that the zero will now occur at the angle $\pi$ and that the response will now decrease to zero not at $\pi/2$ radians but rather at $\pi$ radians. Interpreting this, it means that the response of such an array has an overall shape somewhat like a cardioid, as shown in FIG. 4, and that the beam properties are given directly by the length of the array, i.e., the number of elements 14 in the array determines the doppler sensitivity and hence determines the directivity, and the bandwidth is determined by the way the weights are selected.

If one wanted to approximate an omnidirectional response with this array 10 A and still have directivity in all directions, one would introduce a delay somewhat larger than that just required to move the zero response back to $\pi$ radians, and at that point then the array 10 A would have a response which only drops off slowly as a function of angle, it occuring at angles which are not visible, in other words, there is no angle in real space which can introduce delays greater than the propagation velocity C between elements.

The array is omnidirectional in the sense that it has the capability of looking in all directions. The array 10 A without the delay lines 42, as shown in FIG. 3, did not have the capability of looking broadside. The ray is directional within an omnidirectional envelope, in other words, the envelope of the beams is omnidirectional.

In yet another modification, if two wires are available, say two conductors plus a ground, then one can enlarge the class of functions to not only autocorrelation functions of a single sequence but to the sums of autocorrelation functions for each of the individual leads which is brought back. Thus, as in the case of using a surface wave transducer, if it is desired to get rid of the sidelobes of the autocorrelation function, this can be accomplished for binary weights by going to codings which are Golay sequences rather than the residual sidelobes which would be left using pseudo-random sequences or Barker codes. In general, if additional leads can be brought back, the ambiguity function can be improved in the output by adding up th outputs from each of the available leads that the system allows.

The ambiguity function is the output of a linear filter for all possible mismatches in compression and delay of an input signal. Therefore, if there are two wires coming back, there are two matched filters, one on each wire, each one producing an ambiguity function, and the output, which can be considered to be the output of the beam former, is the sum of the ambiguity functions of the individual leads. In actual fact it has been shown that it is not an ambiguity function in the strict sense of the word. The usuage of the term "ambiguity function" for the sum is ambiguous, but the properties that this function has are analogous to those of the ambiguity function and hence allows use of this generalized concept.

Obviously many modifications and variations on the present invention are possible in the light of the above teachings. It is therefore to be understood that within the scope of the appended claims the invention may be practiced otherwise than as specifically described.

What is claimed is:

1. A beam former, including a receiving array which receives a signal which may be passive and a receiver which processes the received signal;
the receiving array including:
   a flat plate of material, capable of receiving reflected acoustic signals across its broad face;
   an array of receiving elements, for example transducing elements disposed parallel to each other on the surface of the plate, the distance d between two adjacent elements being less than the velocity of propagation C of waves in the flat plate divided by the bandwidth B determined by the highest operating frequency of the array;
   each element having a predetermined weight and polarity for its position in the array;
   a signal summer, whose inputs are the outputs of each of the elements of the array;
   a cable connected to the output of the signal summer; the beam former further comprising:
   a receiver, whose input is connected to the cable, comprising;
      a plurality of transversal filters, each of whose inputs are connected to the cable, each filter having as many taps as there are elements in the array, the taps having the same weights and polarities, in the same order or in reversed order, as the elements of the array, corresponding taps in the various transversal filters having different time delays with respect to adjacent taps in the same filter;
      the outputs of the filters thereby providing various compressions or expansions of the array element weights, it thereby being possible to determine the direction of the incident signal by observing which filter has the largest output.

2. The beam former according to claim 1 wherein the array of receiving comprises a planar array.

3. The beam former according to claim 2, wherein the receiving elements are transducing elements.

4. The beam former according to claim 3, adapted for receiving a sonar signal.

* * * * *